United States Patent Office 3,472,901
Patented Oct. 14, 1969

3,472,901
PROCESS FOR THE PREPARATION OF 2,2,5,5-TETRA-TERT.BUTYLPEROXYHEXANE
Stephanus B. Tijssen, Schalkhaar, and Hans G. Gerritsen, Deventer, Netherlands, assignors to Koninklijke Industrieele Maatschappij Noury & van der Lande, N.V., Deventer, Netherlands, a corporation of the Netherlands
No Drawing. Filed Sept. 23, 1963, Ser. No. 310,870
Claims priority, application Netherlands, Oct. 15, 1962, 284,358
Int. Cl. C07c 73/00
U.S. Cl. 260—610       1 Claim

ABSTRACT OF THE DISCLOSURE

A process is disclosed for preparing 2,2,5,5-tetra-tert.butylperoxyhexane by reacting acetonylacetone with tert. butylhydroperoxide at a temperature between 25° and 45° C. and in the presence of anhydrous oxalic acid as a catalyst with elimination of the water formed during the reaction.

---

The invention relates to a process for cross-linking copolymers of ethylene and monomers containing $$CH_2=CH—$$

groups with the aid of the hitherto unknown 2,2,5,5-tetra-tert.butylperoxyhexane as a cross-linking initiator, as well as to a process for preparing this new peroxide, as well as to this new peroxide per se.

In the cross-linking of copolymers of ethylene and monomers containing $CH_2=CH—$ groups, such as copolymers of ethylene and propylene, of ethylene and vinylacetate, etc., use is often made of peroxidic initiators such as dicumylperoxide and tert.butylcumylperoxide. However, the peroxide most suited to the purpose, viz. dicumylperoxide, has the disadvantage that the finished products obtained by the use of this peroxide possess a very disagreeable odor. As a consequence these peroxidic initiators cannot be employed in many instances.

It has been found, surprisingly, that the hitherto unknown 2,2,5,5-tetra-tert.butylperoxyhexane may be employed as an initiator in the cross-linking of copolymers of ethylene and monomers containing $CH_2=CH—$ groups almost equally as well as the dicumylperoxide which is generally most suited to this purpose and, moreover, it has the additional marked advantage that the finished products cross-linked with this novel peroxide do not possess a disagreeable odor.

Consequently, the present invention relates to a process for cross-linking copolymers of ethylene and monomers containing $CH_2=CH—$ groups with the aid of a novel peroxidic initiator and is characterized by the use of 2,2,5,5-tetra-tert.butylperoxyhexane as the initiator. The present invention moreover includes within its scope a process for making this new peroxide, as well as the new peroxide itself.

The cross-linking of copolymers of ethylene with the aid of the novel initiator according to the present invention may take place in the usual apparatus under otherwise conventional conditions as to temperature and pressure, and if desired in the presence of auxiliary agents such as carbon black, triallylcyanurate, triallylphosphate, sulphur or sulphur-releasing compounds, such as tetramethyl- and tetraethyl-thiuramdisulphide, and accelerators such as diphenylguanidine.

The novel peroxide contemplated by the present invention may be obtained by reacting acetonylacetone with a small excess of tert.butylhydroperoxide at a temperature of 25°–45° C. in the presence of oxalic acid as a catalyst, and eliminating the water formed during the reaction e.g. by azeotropic distillation with benzene under reduced pressure.

In order that the present invention in all its ramifications may be readily understood, the following specific examples are given. Where in Example II below, reference is made to "compression," this was determined with the aid of the Williams plastimeter in the same way as described in S.P.E. Journal, 17 (1961) 265–270, but with the proviso that instead of a weight of 10 kg. a weight of 5 kg. was used.

EXAMPLE I 57 g. (0.5 mole) of acetonylacetone were added dropwise to a mixture of 225 g. (2.4 mole) of tert.butylhydroperoxide and 16 g. of anhydrous oxalic acid in 250 ml. of benzene at a temperature of 40° C. The water formed during the reaction was eliminated during this addition by azeotropic distillation with benzene under reduced pressure. After separation of the water, the benzene was recycled into the reaction mixture. After addition of the acetonylacetone, this process was continued for two hours at a final pot temperature of a maximum of 40° C.

After filtration of the oxalic acid, the filtrate was twice freed from acid with 250 ml. of water and thereafter concentrated by evaporation in vacuo, the temperature of the reaction mixture not exceeding 40° C. The residue was added to 200 ml. of methanol whereafter the resulting solution was allowed to crystallize by cooling down to −35° C.

After filtration, 96 g. of 2,2,5,5-tetra-tert.butylperoxyhexane was obtained, as follows:

Melting point, 65°–66° C.
Active oxygen content, 14.6% (theoretical 14.6%)
Yield, 44% (calculated on acetonylacetone)

After evaporation in vacuo of the methanolic mother liquid at a maximum of 40° C., 87 g. of residue that was again reacted with 135 g. of tert.butylhydroperoxide in the presence of 250 ml. of benzene and 17 g. of anhydrous oxalic acid, was obtained.

After treatment of the reaction product in the way described above, 69 g. of 2,2,5,5-tetra-tert.butylperoxyhexane was obtained, as follows:

Melting point _____° Centigrade__ 65–66
Active oxygen content _____percent__ 14.6
Total yield (calculated on acetonylacetone)_do___ 76

EXAMPLE II

On a mixing roll, at a temperature of 85° C., mixtures containing the following parts by weight were made:

|  | A | B | C | D | E | F | G |
|---|---|---|---|---|---|---|---|
| Copolymer of ethylene and propylene (50% by weight of ethylene) | 100 | 100 | 100 | 100 | | | |
| Copolymer of ethylene and vinylacetate (45% by weight of vinylacetate) | | | | | 100 | 100 | 100 |
| HAF carbon black | 50 | 50 | 50 | 50 | 50 | 50 | 50 |
| Dicumylperoxide | 2.7 | | | | 2.7 | | |
| 2,2,5,5-tetra-tert.butylperoxyhexane | | 2.19 | 1.09 | | | 1.09 | |
| Sulphur | | 0.32 | 0.64 | 0.32 | | | |
| Triallylcyanurate | | | | | | 2 | 2 |

The mixtures thus obtained were cross-linked by working in a press for a period of 40 minutes at 150° C. After 30 minutes at a temperature of 120° C., the compression of samples from the sheets thus obtained was determined. The results were as follows.

| Sheet: | Compression in percent |
|---|---|
| A | 49 |
| B | 4 |
| C | 5 |
| D | 9 |
| E | 52 |
| F | 5 |
| G | 6 |

With the exception of the sheets B and F, the others did not have a disagreeable odor.

While specific examples of preferred methods embodying the present invention have been set forth above, it will be understood that many changes and modifications may be made in the methods of procedure without departing from the spirit of the invention. It will therefore be understood that the examples cited and the particular proportions and methods of operation set forth above are intended to be illustrative only, and are not intended to limit the scope of the invention.

What is claimed is:

1. A process for the preparation of 2,2,5,5-tetra-tert. butylperoxyhexane, comprising reacting acetonylacetone with tert.butylhydroperoxide at a temperature between 25°–45° C. in the presence of anhydrous oxalic acid as a catalyst with elimination of the water formed during the reaction.

References Cited

UNITED STATES PATENTS 2,455,569  12/1948  Dickey _____ 260—610
3,111,500  11/1963  Bartl et al. _____ 260—41

MORRIS LIEBMAN, Primary Examiner

J. H. DERRINGTON, Assistant Examiner

U.S. Cl. X.R.

260—41, 85.7, 88.2